Oct. 23, 1956
N. K. HEARN
2,767,480
APPARATUS FOR TESTING THE ADJUSTING OF
AUTOMOBILE HEADLAMPS
Filed Oct. 27, 1954
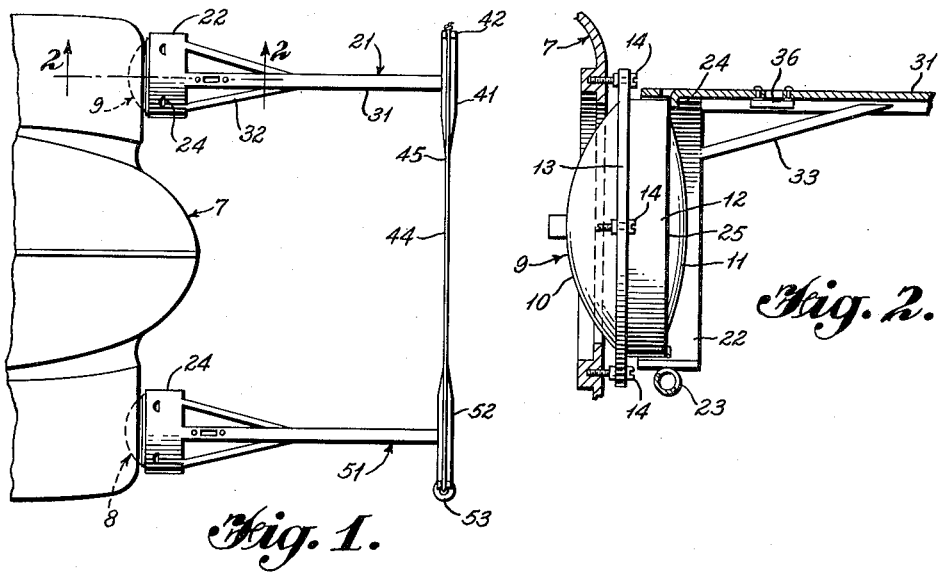
*Fig. 1.*
*Fig. 2.*
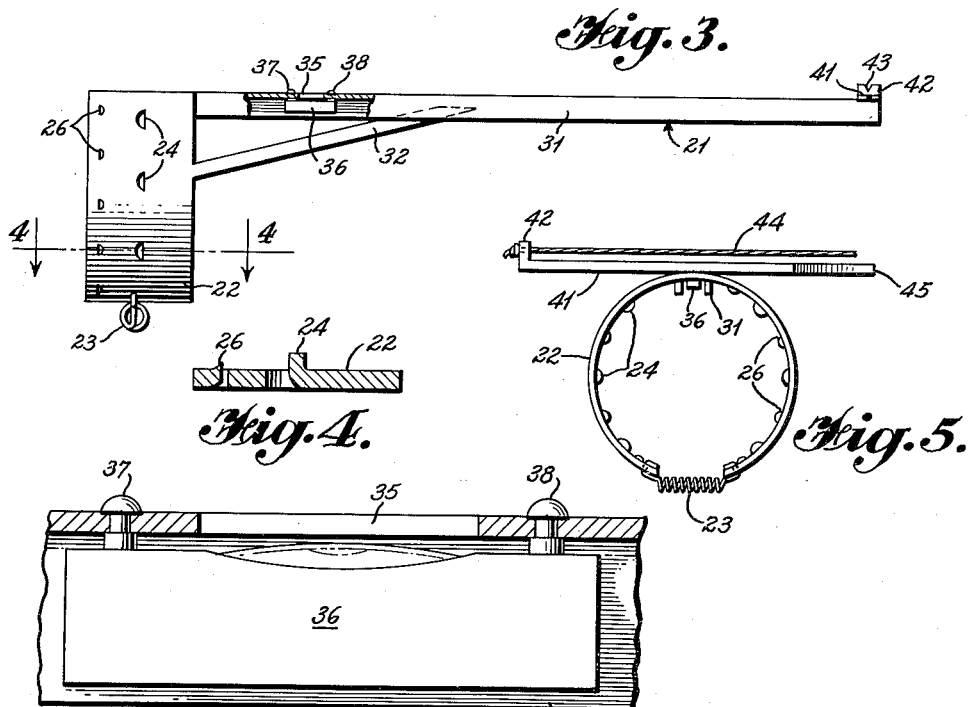
*Fig. 3.*
*Fig. 4.*
*Fig. 5.*
*Fig. 6.*
INVENTOR.
*Norval K. Hearn*
BY
*Burns, Doane, Benedict & Irons*

United States Patent Office 2,767,480
Patented Oct. 23, 1956

2,767,480

APPARATUS FOR TESTING THE ADJUSTING OF AUTOMOBILE HEADLAMPS

Norval K. Hearn, Emporia, Kans.

Application October 27, 1954, Serial No. 464,974

1 Claim. (Cl. 33—180)

The present invention relates to apparatus for testing the adjustment of automobile headlamps, particularly headlamps of the sealed unit type.

Automobile headlamps of the sealed unit type have a reflector, a lens, a source of light and a retaining ring assembled as a unit. The retaining ring is adjustably secured to the automobile and adjustment of the headlamp is obtained by adjusting the retaining ring relative to the automobile body.

The present apparatus comprises a pair of sheet metal, split clamping rings, each provided with a tension spring member urging the ends of the split ring toward each other. The split clamping rings are of a size and configuration to engage and encircle the retaining rings on the automobile headlamps. Each clamping ring is provided with a standard which projects forwardly from the periphery of the clamping ring. Each clamping ring is provided with inwardly struck tongue portions which engage the forward edge of the retaining ring on the headlamp, thereby positioning the clamping ring to cause the standard to extend in parallel relationship to the beam of the headlamp. Means are provided on each of the standards to quickly ascertain when the standards are in parallel relation to each other and therefore in parallel relation to the longitudinal axis or direction of travel of the automobile. Means are also provided for ascertaining the degree of inclination of the standards from the horizontal to thereby ascertain the extent of downward deflection of the beams from the headlamps.

One of the primary objects of the invention is to provide simple and inexpensive apparatus which can be used by relatively inexperienced personnel to accurately adjust automobile headlamps. Another object of the invention is to provide apparatus for the foregoing purpose which can be inexpensively constructed of sheet metal, which is capable of withstanding rough usage and in which the only delicate portions of the apparatus are protected from likelihood of damage through contact with tools or other objects.

The foregoing and other objects and advantages of the invention will be more thoroughly understood by reference to the accompanying drawing, wherein:

Figure 1 is a top plan view of the forward portion of an automobile with the apparatus applied to the headlamps;

Figure 2 is a sectional view taken in the direction of the arrows along the line 2—2 of Figure 1;

Figure 3 is a side elevational view of one unit of the apparatus, a portion of the unit being shown broken away to illustrate the protected position of the spirit level;

Figure 4 is a sectional view taken in the direction of the arrows along the line 4—4 of Figure 3;

Figure 5 is a rear end elevational view of the unit shown in Figure 3; and

Figure 6 is an enlarged longitudinal sectional view through a portion of the standard of one of the units of the apparatus.

The forward portion of an automobile is designated generally by the reference numeral 7. The automobile is provided with headlamps 8 and 9 of the sealed unit type. Such headlamps are conventionally surrounded by an ornamental ring which is readily removable and which is not present in Figure 1. As best shown in Figure 2, the headlamp is provided with a reflector 10, a lens 11 and a retaining ring 12. The retaining ring 12 is provided with a peripheral flange 13 carrying a plurality of adjusting screws 14 which adjustably engage the automobile 7. Proper adjustment of the adjusting screws 14 will result in proper adjustment of the beam of the headlamp in a manner well understood in the art.

Adapted for use with the left headlamp 9 of the automobile is one unit of the apparatus which is designated generally by the reference numeral 21. This unit comprises a split clamping ring 22 provided with a tension spring member 23 which urges the ends of the clamping ring 22 toward each other. The clamping ring 22 is of a size and configuration to encircle and engage the retaining ring 12 of the headlamp 9. A plurality of tongues 24 are struck inwardly from the inner surface of the clamping ring 22 in the manner best shown in Figure 4. The tongues 24 are positioned in such a manner that when they engage the forward edge 25 of the retaining ring 12 of the headlamp 9, the longitudinal axis of the clamping ring 22 will coincide with the axis of the light beam projected by the headlamp. The retaining ring 22 may also be provided with smaller tongues 26 struck inwardly from the inner surface of the clamp ring 22. The tongues 26 resiliently engage the outer surface of the retaining ring 12 of the headlamp 9 and assure uniform contact, irrespective of any irregularities or protuberances which may exist in the outer surface of the retaining ring 12.

The unit 21 is provided with a standard or elongated member 31 which projects forwardly from the periphery of the clamping ring 22. The standard 31 will extend in parallel relationship to the axis of the light beam projected by the headlamp 9 when the clamping ring 22 is positioned as described above. The standard 31 is of inverted U-shape in cross section, thus providing an inverted channel member, the flanges of which extend generally toward the axis of the clamping ring 22. A pair of braces 32 and 33 extend from the clamping ring 22 to an intermediate portion of the standard 31 and serve to add strength and rigidity to the unit.

The standard 31 is provided with an opening 35 in its upper surface between the forward end of the clamping ring 22 and the points of attachment of the braces 32 and 33 to the standard. A spirit level 36 of any conventional construction is secured immediately below the opening 35 and between the side flanges of the standard 31. The spirit level 36 may be secured in any suitable manner as by means of screws 37 and 38.

An elongated cross element or indicating pointer 41 is rigidly secured to the forward end of the standard 31 and extends at a right angle to that standard in the manner best shown in Figure 1. The indicating pointer 41 is provided at one end with an upwardly extending projection or flange 42 having a notch or slot 43 therein for engaging and retaining the knotted end of a cord 44. The opposite end 45 of the indicating pointer 41 is in the form of a point to facilitate accurately detecting when the cord 44 extends in parallel relationship to the longitudinal axis of the pointer 41.

The unit for use with the right-hand headlamp 8 is designated generally by the reference numeral 51 and is identical with the unit 21 except for the fact that the indicating pointer 52 extends in a direction opposite to the direction of the indicating pointer 41.

The operation of the apparatus can now be briefly described. The units 21 and 51 are positioned on the headlamps 9 and 8 respectively, care being exercised to make certain that these units are pushed rearwardly to cause the inwardly struck tongues 24 to engage the forward edges of the retaining rings 12 of the headlamps. The knotted end of the cord 44 is positioned in the notch 43 of the unit 21. A weight 53 is secured to the opposite end of the cord 44 which passes through the corresponding notch 43 in the indicating pointer 52. The adjusting screws 14 of the headlamps 8 and 9 are then adjusted until the cord 44 exactly overlies the pointed ends 45 of the indicating pointers 41 and 52. This adjustment assures that the light beams projected by the headlamps 8 and 9 are parallel to each other and parallel to the direction of travel of the automobile. The adjusting screws 14 of the headlamps 8 and 9 are then adjusted until the spirit levels 36 associated with the units 21 and 51 indicate that the light beams of both headlamps have the desired deflection to the horizontal.

The split clamping rings 22 can be easily and quickly positioned on the retaining rings of the headlamps. The spring members 23 assure that the clamping rings will remain in proper position on the headlamps during the adjusting operation. The positioning of the spirit levels 36 between the flanges of the standards to which they are attached serves to protect the spirit levels from being struck by tools or other objects and thus prevents damage to the spirit levels. The braces 32 and 33 also serve to protect the spirit levels 36. The apparatus can be produced at low cost and sold at a price which makes it economically available to operators unable to make the substantial investment required to obtain apparatus operating on optical principles.

I have illustrated and described what I now consider to be the preferred form of my invention. It will be understood, however, that various modifications may be made without departing from the scope of the invention as defined by the following claim.

Having thus described my invention, I claim:

In apparatus for testing the adjustment of automobile headlamps having an elongated member extending forwardly from the headlamp when placed in use with its longitudinal axis substantially horizontal and means on one end of the member for attaching the same to the headlamp, an elongated cross element rigidly secured to the member at its opposite end and having its longitudinal axis horizontally disposed when the member is attached to the headlamp, said axes of the member and the element being relatively perpendicular, said element being provided with an upturned flange at one end thereof having an uppermost edge and a slot extending downwardly from said uppermost edge in alignment with said axis of the element and terminating above the uppermost face of the latter in spaced relationship thereto, said element being provided with a pair of opposed longitudinal edges in parallel relationship throughout substantially the entire length of the element, said edges converging toward the longitudinal axis of the element at the opposite end of the latter, presenting a pointer.

References Cited in the file of this patent
UNITED STATES PATENTS

| | | |
|---|---|---|
| 2,557,893 | Russell et al. | June 19, 1951 |
| 2,609,611 | Dickson | Sept. 9, 1952 |